United States Patent
Pandita et al.

(10) Patent No.: US 9,815,462 B2
(45) Date of Patent: Nov. 14, 2017

(54) PATH DETERMINATION FOR AUTOMATED VEHICLES

(71) Applicant: Toyota Motor Engineering & Manufacturing North America, Inc., Erlanger, KY (US)

(72) Inventors: Rohit Pandita, Ann Arbor, MI (US); Vladimeros Vladimerou, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 110 days.

(21) Appl. No.: 14/837,363

(22) Filed: Aug. 27, 2015

(65) Prior Publication Data

US 2017/0057502 A1    Mar. 2, 2017

(51) Int. Cl.
| | |
|---|---|
| *G01C 22/00* | (2006.01) |
| *B60W 30/12* | (2006.01) |
| *B60W 50/00* | (2006.01) |
| *G05D 1/02* | (2006.01) |

(52) U.S. Cl.
CPC ........ *B60W 30/12* (2013.01); *B60W 50/0098* (2013.01); *G05D 1/0212* (2013.01)

(58) Field of Classification Search
CPC .......................... B60W 30/12; B60W 50/0098
See application file for complete search history.

(56) References Cited

U.S. PATENT DOCUMENTS

| | | | |
|---|---|---|---|
| 6,292,752 B1 * | 9/2001 | Franke ................. | G01S 13/931 340/435 |
| 6,732,021 B2 * | 5/2004 | Matsumoto ......... | B60T 8/17557 180/170 |
| 7,034,742 B2 * | 4/2006 | Cong ................. | B60K 31/0008 342/107 |

(Continued)

OTHER PUBLICATIONS

Fujitsu Laboratories Ltd., "Fujitsu Laboratories Develops Lane-Departure Warning Technology Using Wide-Angle Camera", Retrieved from the Internet: <http://www.fujitsu.com/global/about/resources/news/press-releases/2014/0610-01.html>, Retrieved Jun. 3, 2015, (6 pages).

(Continued)

*Primary Examiner* — Ian Jen
(74) *Attorney, Agent, or Firm* — Christopher G. Darrow; Darrow Mustafa PC

(57) ABSTRACT

An automated vehicle can generate a path. Sensor data of at least a forward portion of an external environment of the vehicle can be acquired. One or more travel lane markers of a current travel path of the automated vehicle can be identified from the acquired sensor data. A detection range of the acquired sensor data can be determined. A set of travel lane parameters based on the identified one or more travel lane markers can be determined. In at least some instances, the set of travel lane parameters can include at least: offset, curvature, curvature derivative, and yaw. It can be determined whether any of the determined travel lane parameters are reliable based on the determined detection range. In one or more arrangements, a vehicle path can be determined based at least partially on the travel lane parameters that are determined as being reliable.

20 Claims, 5 Drawing Sheets

(56) References Cited

U.S. PATENT DOCUMENTS

| | | | |
|---|---|---|---|
| 7,107,137 B2* | 9/2006 | Tange | B60T 8/17557 |
| | | | 701/301 |
| 8,712,691 B2* | 4/2014 | Joh | B60W 40/072 |
| | | | 701/2 |
| 8,775,063 B2 | 7/2014 | Zeng | |
| 2010/0121518 A1* | 5/2010 | Tiernan | G01C 21/30 |
| | | | 701/26 |
| 2010/0191461 A1* | 7/2010 | Zeng | B60W 40/076 |
| | | | 701/532 |
| 2010/0253596 A1* | 10/2010 | Szczerba | G01S 13/723 |
| | | | 345/7 |
| 2012/0062747 A1* | 3/2012 | Zeng | B60W 40/06 |
| | | | 348/149 |
| 2014/0236482 A1* | 8/2014 | Dorum | G01C 21/34 |
| | | | 701/533 |
| 2014/0358321 A1* | 12/2014 | Ibrahim | G01S 19/39 |
| | | | 701/1 |

OTHER PUBLICATIONS

Eidehall et al., "Combined road prediction and target tracking in collision avoidance", IEEE Intelligent Vehicles Symposium, 2004, (6 pages).

Schon et al., "Lane departure detection for improved road geometry estimation", IEEE Intelligent Vehicles Symposium, 2006, pp. 1-6, (6 pages).

* cited by examiner

Dynamic Model $$dW/dt = 0 + w_1$$
$$dc_0/dt = v.c_1 + w_2$$
$$dc_1/dt = 0 + w_3$$
$$dy_{off}/dt = v.\sin\Psi_{rel} + w_4$$
$$d\Psi_{rel}/dt = r_m - r_b - v.c_0 + w_5$$
$$dr_b/dt = 0 + w_6$$
$$dr_a/dt = 0 + w_7$$

Measurement Model $$W^m = W + v_1$$
$$C_0^m = C_0 + v_2$$
$$C_1^m = C_1 + v_3$$
$$y_{off}^m = y_{off} + v_4$$
$$\Psi^m{}_{rel} = \Psi + v_5$$
$$r_m = r_a + r_b + v_6$$

FIG. 5

PATH DETERMINATION FOR AUTOMATED VEHICLES

FIELD

The subject matter described herein relates in general to vehicles having an automated operational mode and, more particularly, to the generation of a path for such vehicles to follow when operating in the automated operational mode.

BACKGROUND

Some vehicles include an operational mode in which a computing system is used to navigate and/or maneuver the vehicle along a travel route with minimal or no input from a human driver. Such vehicles include sensors that are configured to detect information about the surrounding environment, including the presence of objects or vehicles in the environment. The computing systems are configured to process the detected information to determine how to navigate and/or maneuver the vehicle through the surrounding environment.

SUMMARY

In one respect, the present disclosure is directed to a method of generating a path for an automated vehicle. The method can include acquiring sensor data of at least a forward portion of an external environment of the automated vehicle. The method can include identifying from the acquired sensor data one or more travel lane markers of a current travel path of the automated vehicle. The method can also include determining a detection range of the acquired sensor data. The method can further include determining a set of travel lane parameters based on the identified one or more travel lane markers of the current travel path of the automated vehicle. The method can include determining which if any of the set of travel lane parameters are reliable based on the determined detection range. The method can include determining a path for the automated vehicle based at least partially on the travel lane parameters that are determined as being reliable.

In another respect, the present disclosure is directed to a system for generating a path for an automated vehicle. The system includes a sensor system and a processor operatively connected to the sensor system. The sensor system can be configured to acquire sensor data of at least a forward portion of an external environment of the automated vehicle. The processor can be programmed to initiate executable operations. The executable operations can include identifying from the acquired sensor data one or more travel lane markers of a current travel path of the automated vehicle. The executable operations can include determining a detection range of the acquired sensor data. The executable operations can include determining a set of travel lane parameters based on the identified one or more travel lane markers of the current travel path of the automated vehicle. The executable operations can include determining which if any of the set of travel lane parameters are reliable based on the determined detection range. The executable operations can include determining a path for the automated vehicle based at least partially on the travel lane parameters that are determined as being reliable In yet another respect, the present disclosure is directed to a computer program product for generating a path for an automated vehicle. The computer program product comprises a computer readable storage medium having program code embodied therein. The program code can be executable by a processor to perform a method. The method can include acquiring sensor data of at least a forward portion of an external environment of the automated vehicle. The method can include identifying from the acquired sensor data one or more travel lane markers of a current travel path of the automated vehicle. The method can also include determining a detection range of the acquired sensor data. The method can further include determining a set of travel lane parameters based on the identified one or more travel lane markers of the current travel path of the automated vehicle. The method can include determining which if any of the set of travel lane parameters are reliable based on the determined detection range. The method can include determining a path for the automated vehicle based at least partially on the travel lane parameters that are determined as being reliable.

BRIEF DESCRIPTION OF THE DRAWINGS

FIG. 5 presents examples of equations for modeling road geometry and the motion of an automated vehicle.

DETAILED DESCRIPTION

Figure 1:
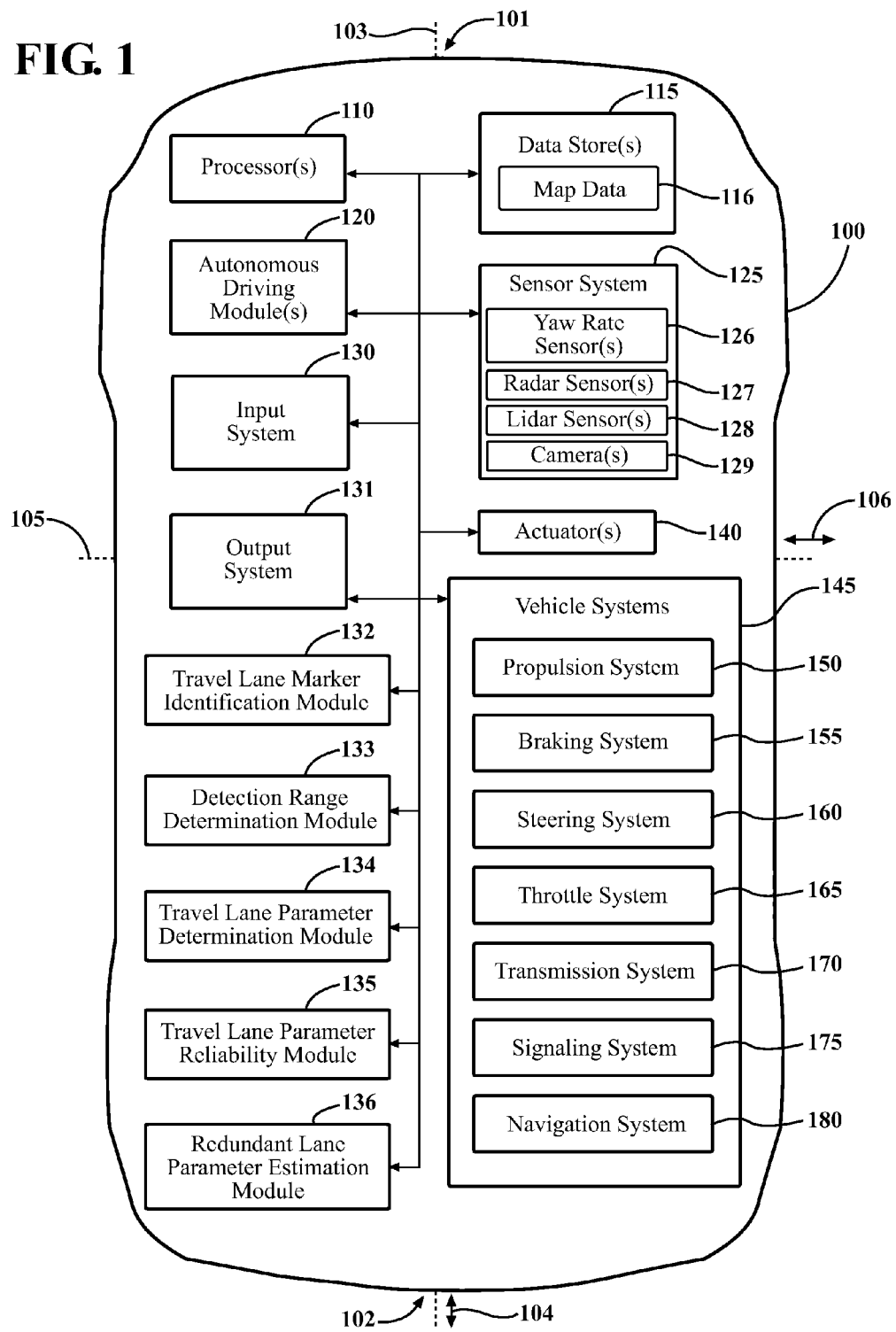
FIG. 1 is an example of an automated vehicle.

This detailed description relates to path generation for an automated vehicle. Sensor data of at least a forward portion of an external environment of the automated vehicle can be acquired. From the acquired sensor data, one or more travel lane markers of a current travel path of the automated vehicle can be identified. A detection range of the acquired sensor data can be determined. A set of travel lane parameters (e.g., offset, curvature, curvature derivative, and yaw) can be determined based on the identified one or more travel lane markers of the current travel path of the automated vehicle. It can be determined which if any of the set of travel lane parameters are reliable based on the determined detection range. The present detailed description relates to systems, methods and computer program products that incorporate such features. In at least some instances, such systems, methods and computer program products can improve the performance of the automated vehicle and/or the safe operation of the automated vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In one or more implementations, the vehicle 100 may be a watercraft, an aircraft or any other form of motorized transport. The vehicle 100 can have a front end 101 and a back end 102.

The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

According to arrangements herein, the vehicle 100 can be an automated vehicle. As used herein, "automated vehicle" means a vehicle that configured to operate in an automated mode. "Automated mode" means that one or more computing systems are used to navigate and/or maneuver the vehicle along a travel route with minimal or no input from a human driver. In one or more arrangements, the vehicle 100 can be highly automated. In some instances, the vehicle 100 can be configured to be selectively switched between an automated mode and a manual mode. Such switching can be implemented in any suitable manner, now known or later developed. "Manual mode" means that a majority of the navigation and/or maneuvering of the vehicle along a travel route is performed by a human driver.

The vehicle 100 can include various elements, some of which may be a part of an automated driving system. Some of the possible elements of the vehicle 100 are shown in FIG. 1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. The map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360 degree ground views. The map data 116 can be highly detailed. In some instances, the map data 116 can be located onboard the vehicle 100. Alternatively, at least a portion of the map data 116 can be located in a data store or source that is remote from the vehicle 100. The map data 116 can include terrain data. The terrain data can include information about the terrain of one or more geographic areas. The terrain data can include elevation data in the one or more geographic areas. In some instances, the terrain data can be located onboard the vehicle 100. The map data 116 can include a digital map with information about road geometry, including road curvature and curvature derivative.

The vehicle 100 can include an automated driving module 120. The automated driving module 120 can be implemented as computer readable program code that, when executed by a processor, implement one or more of the various processes described herein, including, for example, determining path(s), current driving maneuvers for the vehicle 100, future driving maneuvers and/or modifications. The automated driving module 120 can also cause, directly or indirectly, such path(s), driving maneuvers, and/or modifications thereto to be implemented. The automated driving module 120 can be a component of the processor 110, or the automated driving module 120 can be executed on and/or distributed among other processing systems to which the processor 110 is operatively connected.

The automated driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store 115 may contain such instructions.

The vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the automated driving module 120 and/or other element of the vehicle 100. The sensor system 125 can be used to take one or more sensor observations of at least a portion of the driving environment of the vehicle 100. As used herein, "sensor observation" means one or more sensors of a sensor system are used to acquire sensor data of at least a portion of a driving environment of a vehicle in a moment of time or within a period of time.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary objects and/or dynamic objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can detect, determine, assess, monitor, measure, quantify, and/or sense one or more characteristics of the vehicle 100. In one or more arrangements, the sensor system 125 can include a speedometer (not shown). The speedometer can determine a current speed of the vehicle 100, or data acquired by the speedometer can be used to determine a current speed of the vehicle 100. In one or more arrangements, the vehicle 100 can have a yaw rate sensor 126.

The sensor system 125 can include one or more sensors configured to sense the external environment of the vehicle 100 or portions thereof. For instance, the sensor system 125 can be configured to acquire data of at least a forward portion of an external environment of the automated vehicle 100. "Forward portion" means a portion of the external environment that is located in front of the vehicle in the travel direction of the vehicle. Such environment sensors can be configured to detect, determine, assess, monitor, measure, quantify and/or sense objects in at least a portion of the external environment of the vehicle 100 and/or information/data about such objects. Various examples of such sensors will be described herein. However, it will be understood that the embodiments are not limited to the particular sensors described.

In one or more arrangements, the sensor system 125 can include one or more ranging sensors. "Ranging sensors" include sensors that can detect, determine, assess, monitor, measure, quantify and/or sense objects from a distance and do not require physical contact with the object. Various examples of ranging sensors will be described herein.

As an example, in one or more arrangements, the sensor system 125 can include one or more radar sensors 127. "Radar sensor" means any device, component and/or system that can detect, determine, assess, monitor, measure, quantify and/or sense something using at least in part radio signals. The one or more radar sensors 127 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object and/or the movement of each detected object. The one or more radar sensors 127, or data obtained thereby, can determine the speed of objects in the external environment of the vehicle 100. The one or more radar sensors 127 can have three dimensional coordinate data associated with it the objects.

In one or more arrangements, the sensor system 125 can include one or more lidar sensors 128. "Lidar sensor" means any device, component and/or system that can detect, determine, assess, monitor, measure, quantify and/or sense something using at least in part lasers. The lidar sensor can include a laser source and/or laser scanner configured to emit a laser signal and a detector configured to detect reflections of the laser signal. The lidar sensor may be configured to operate in a coherent or an incoherent detection mode.

The one or more lidar sensors 128 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the elevation of each detected object, the speed of each detected object, and/or the movement of each detected object.

Alternatively or in addition to any of the sensors described above, the sensor system 125 can include other types of sensors. As an example, the sensor system 125 can include one or more sonar sensors (not shown). The sensor system 125, the processor 110, and/or one or more other elements of the vehicle 100 can be configured to detect forward vehicles relative position and velocity in the same travel lane as the present vehicle 100 or in neighboring or nearby travel lanes.

The vehicle 100 can include one or more cameras 129. "Camera" includes any device(s), component(s), and/or system(s) that is configured to capture visual data. "Visual data" includes video and/or image information/data. The visual data can be in any suitable form.

Visual data acquired by the one or more cameras 129 can be used to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions, the elevation of each detected object, the speed of each detected object, and/or the movement of each detected object.

The one or more cameras 129 can be high resolution cameras. The high resolution can refer to the pixel resolution, the spatial resolution, spectral resolution, temporal resolution and/or radiometric resolution. In one or more arrangements, the one or more cameras 129 can be high dynamic range (HDR) cameras or infrared (IR) cameras.

In one or more arrangements, one or more of the cameras 129 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The image capture element may capture images in any suitable wavelength on the electromagnetic spectrum. The image capture element may capture color images and/or grayscale images. The one or more of the cameras 129 can be configured with zoom in and/or zoom out capabilities.

In one or more arrangements, one or more of the cameras 129 can be oriented, positioned, configured, operable, and/or arranged to capture visual data from at least a portion of the external environment of the vehicle 100. In one or more arrangements, one or more cameras 129 can be oriented, positioned, configured, operable, and/or arranged to capture visual data from at least a forward portion of the external environment of the vehicle 100. As a further example, at least one camera 129 can be oriented, positioned, configured, operable, and/or arranged to acquire visual data from at least a left forward portion of the external environment of the vehicle 100. In such case, at least one camera 129 can be oriented, positioned, configured, operable, and/or arranged to acquire visual data from at least a right forward portion of the external environment of the vehicle 100.

The one or more cameras 129 can be located in any suitable portion of the vehicle 100. For instance, one or more of the cameras 129 can be located within the vehicle 100. One or more of the cameras 129 can be located on the exterior of the vehicle 100. One or more of the cameras 129 can be located on or exposed to the exterior of the vehicle 100. As an example, the one or more cameras 129 can be located in a central region at or near the front end 101 of the vehicle 100. As another example, one or more cameras 129 can be located on the roof of the vehicle 100.

The position of one or more of the cameras 129 can be fixed such that its position does not change relative to the vehicle 100. One or more of the cameras 129 can be movable so that its position can change to allow visual data from different portions of the external environment of the vehicle 100 to be captured. The movement of the cameras 129 can be achieved in any suitable manner. For instance, the cameras 129 can be rotatable about one or more axes, pivotable, slidable, and/or extendable, just to name a few possibilities. In one or more arrangements, the cameras 129 can have any suitable range of motion, including, for example, substantially spherical, substantially hemi-spherical, substantially circular and/or substantially linear. The one or more cameras 129 and/or the movement of the one or more cameras 129 can be controlled by a camera system, the sensor system 125, the processor 110 and/or any one or more of the modules described herein or other module.

The sensor system 125, the processor 110, and/or one or more other elements of the vehicle 100 can be operable to control movements of one or more of the sensors of the sensor system 125. It should be noted that any of the sensors described herein can be provided in any suitable location with respect to the vehicle 100. For instance, one or more sensors can be located within the vehicle 100, one or more sensors can be located on the exterior of the vehicle and/or one or more sensors can be located so as to be exposed to the exterior of the vehicle 100.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 131. An "output system" is defined as any device, component, system, element or arrangement or groups thereof that enable information/data to be presented to a vehicle occupant (e.g. a person, a vehicle occupant, etc.). The output system 131 can present information/data to a vehicle occupant. The output system 131 can include a display, as described above. Alternatively or in addition, the output system 131 may include a microphone, earphone and/or speaker. Some components of the vehicle 100 may serve as both a component of the input system 130 and a component of the output system 131.

In one or more arrangements, the vehicle 100 can include a travel lane marker identification module 132. The travel lane marker identification module 132 can be implemented as computer readable program code that, when executed by a processor, implement one or more of the various processes described herein. The travel lane marker identification module 132 can be a component of the processor 110, or the travel lane marker identification module 132 can be executed on and/or distributed among other processing systems to which the processor 110 is operatively connected. The travel lane marker identification module 132 can include instructions (e.g., program logic) executable by the processor 110. Alternatively or in addition, the data store 115 may contain such instructions.

In some arrangements, the travel lane marker identification module 132 can be configured to detect, determine, assess, measure, analyze, recognize, and/or to identify travel lane markers and/or other road markers from visual data (e.g., visual data obtained by the one or more cameras 129). The travel lane marker identification module 132 can identify the travel lane marker using a machine vision system using any suitable technique, now known or later developed. A "travel lane" is a portion of a road that is designated for use by a single line of vehicles and/or a portion of a road that is being used by a single line of vehicles.

As an example, the travel lane marker identification module 132 can also include any suitable object recognition software. The object recognition software can analyze an image captured by one or more cameras 129. In some instances, the object recognition software can query an object image database for possible matches. For instance, images captured by one or more cameras 129 can be compared to images in the object image database for possible matches. Alternatively or in addition, measurements or other aspects of visual data captured by one or more cameras 129 can be compared to measurements or other aspects of any images in the object image database. In some instances, the travel lane marker identification module 132 can identify a travel lane marker if there is a match between the captured image and an image in the object database. "Match" or "matches" means that visual data acquired by one or more cameras 129 and one or more of the images in the object image database are substantially identical. For instance, the visual data acquired by one or more cameras 129 and one or more of the images in the object image database can match within a predetermined probability (e.g., at least about 85%, at least about 90%, at least about 95% or greater) or confidence level.

In one or more arrangements, the vehicle 100 can include a detection range determination module 133. The detection range determination module 133 can be implemented as computer readable program code that, when executed by a processor, implement one or more of the various processes described herein. The detection range determination module 133 can be a component of the processor 110, or the detection range determination module 133 can be executed on and/or distributed among other processing systems to which the processor 110 is operatively connected. The detection range determination module 133 can include instructions (e.g., program logic) executable by the processor 110. Alternatively or in addition, the data store 115 may contain such instructions.

As used herein, "detection range" is a measure of a distance and/or an amount of time that is observable or detectable in data acquired by one or more sensors of a forward environment of the vehicle. The detection range can be a maximum distance or a maximum amount of time associated with acquired data. Alternatively, the detection range can be a maximum distance and/or a maximum time associated with a particular feature in the acquired data. When the detection range is defined with respect to an amount of time, the detection range can be dependent upon the current speed of the vehicle 100.

In one or more arrangements, the vehicle 100 can include a travel lane parameter determination module 134. The travel lane parameter determination module 134 can be implemented as computer readable program code that, when executed by a processor, implement one or more of the various processes described herein. The travel lane parameter determination module 134 can be a component of the processor 110, or the travel lane parameter determination module 134 can be executed on and/or distributed among other processing systems to which the processor 110 is operatively connected. The travel lane parameter determination module 134 can include instructions (e.g., program logic) executable by the processor 110. Alternatively or in addition, the data store 115 may contain such instructions.

In some arrangements, the travel lane parameter determination module 134 be configured to determine one or more parameters of a travel lane. More particularly, the travel lane parameter determination module 134 can be configured to determined one or more parameters of a current travel path of the vehicle 100. "Current travel path" means any surface(s) upon and/or along which a vehicle is traveling at the present time. In some instances, the current travel path can include the immediate area of the vehicle as well as a portion of the area near the vehicle, including portions that the vehicle has already traveled and areas where the vehicle will be traveling. In one or more arrangements, the current travel path can be the current travel lane of the vehicle. "Current travel lane" means a travel lane in which at least a substantial portion of a vehicle is traveling at the present time. The one or more travel lane parameters can be determined in any suitable manner. For instance, the one or more travel lane parameters can be determined based on the identified one or more travel lane markers of the current travel path of the automated vehicle. The determination can include assessing, measuring, quantifying and/or sensing, directly or indirectly, one or more aspects of the current travel path of the automated vehicle.

In one or more arrangements, the travel lane parameter determination module 134 can determine a set of travel lane parameters. "Set of travel lane parameters" means two or more travel lane parameters. In one or more arrangements, the set of travel lane parameters can be a predetermined set of travel lane parameters. For instance, in one or more arrangements, the set of travel lane parameters can include offset, curvature, curvature derivative, and yaw. In some instances, the set of travel lane parameters can also include lane width.

Figure 2:
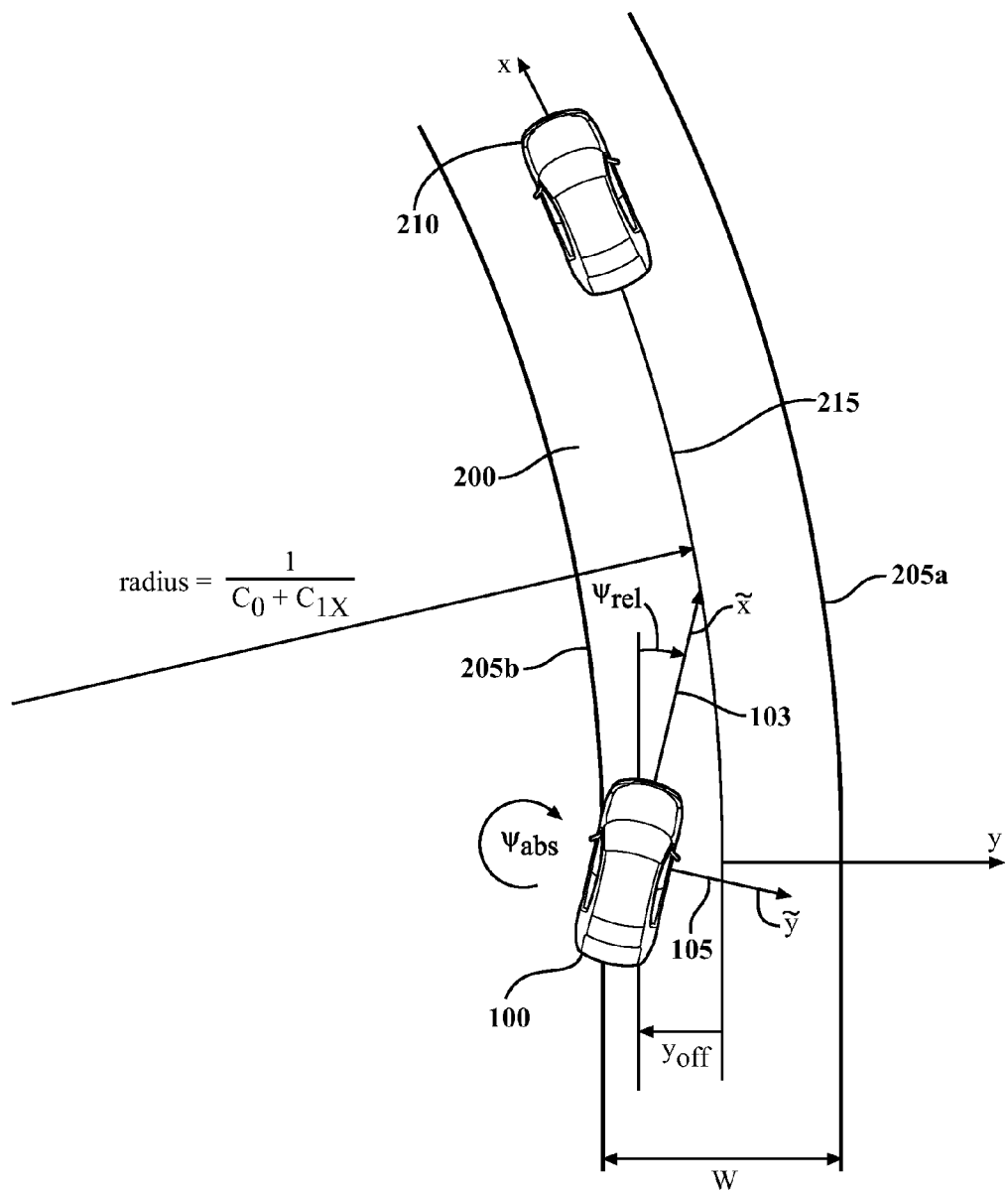
FIG. 2 is a view of various travel lane parameters that can be determined based on the identified one or more travel lane markers of the current travel path of the automated vehicle.

Referring to FIG. 2, each of these travel lane parameters will be described in turn. In FIG. 2, the vehicle 100 can be traveling in a travel lane 200. In at least some areas, the travel lane 200 can be defined by a pair of travel lane markers 205a, 205b. In some instances, there can be a forward vehicle 210 located in the travel lane 200.

One of the travel lane parameters can be lane width W. "Lane width" means the distance between two travel lane markers 205a, 205b that define the lateral boundaries of a travel lane. The distance can be measured in a direction that is substantially perpendicular to at least one of the travel lane markers 205a, 205b. The lane width W can be substantially constant along at least a portion of the length of a travel lane. In one or more arrangements, the lane width W can vary in one or more regions along the length of the travel lane. The lane width W can be determined by calculating the distance between two identified lane markers in the sensor data acquired by the sensor system 125 (e.g., in the visual data acquired by the camera(s) 129).

Another travel lane parameter can be lateral offset $y_{off}$. In this respect, "offset" means a lateral distance from the center (e.g., a center point or a centerline) of a current travel lane of a vehicle and a portion of the vehicle. In this context, "lateral" means in a direction that is substantially perpendicular to at least one of the lane markers of the current travel path. Referring to FIG. 2, the offset $y_{off}$ can be a lateral distance from the centerline 215 of the current travel lane 200 and portion of the vehicle 100. The offset $y_{off}$ can be determined using at least in part the sensor data acquired by the sensor system 125 (e.g., visual data acquired by the camera(s) 129). In one or more arrangements, the center of the travel lane can be determined by dividing the lane width W, as calculated above, by two. In one or more arrangements, the portion of the reference vehicle can be determined in any suitable manner. For instance, the portion of the reference vehicle can be defined by a plane that is substantially parallel to at least one of the lane markers of the current travel path. The plane can pass through a predetermined point, area, or region of the vehicle 100.

Another travel lane parameter is curvature $C_0$ of the current travel path (e.g., current travel lane 200) of the vehicle 100. "Curvature" is a description of a non-linear portion of a centerline of the current travel lane 200. In some instances, at least a portion of the current travel lane 200 can be substantially straight. In such cases, the curvature $C_0$ can be zero. The curvature $C_0$ of the current travel lane 200 can be determined based at least partially on the sensor data acquired by the sensor system 125 (e.g., visual data acquired by the camera(s) 129). In one or more arrangements, at least a portion of the road geometry can be based on a Clothoid curve. As an example, at least a portion of the road geometry can be expressed as follows:

$$y(x) = y_0 + \frac{c_0}{2}x^2 + \frac{c_1}{6}x^3$$

The curvature $C_0$ can be defined by one or more radii. The travel lane parameter determination module 134 can be configured to fit one or more radii to the centerline of the current travel lane 200. The curvature $C_0$ can be substantially constant along at least a portion of the length of a travel lane 200. In one or more arrangements, the curvature $C_0$ can vary in one or more regions along the length of the travel lane 200.

Another travel lane parameter can be curvature derivative $C_1$ of the current travel lane 200 of the vehicle 100. "Curvature derivative" is the rate of change of curvature with respect to longitudinal distance along the travel lane. As is shown in FIG. 2, the radius of the current travel lane at any distance "x" along the travel lane can be expressed as: $1/(C_0+C_1 x)$.

Another travel lane parameter can be yaw $\psi_{rel}$. "Yaw" refers to an angular measure between the longitudinal axis 103 of the vehicle 100 and an axis 220 defined by the centerline 215 of the current travel lane 200 at the current location of the vehicle 100 and portions of the centerline. The yaw $\psi_{rel}$ can be determined using at least in part the sensor data acquired by the sensor system 125. For instance, in one or more arrangements, the yaw $\psi_{rel}$ can be determined using at least in part the visual data acquired by the camera(s) 129. The yaw $\psi_{rel}$ can be defined by any suitable unit of measure, such as radians. In some arrangements, the longitudinal axis 103 of the vehicle 100 can be substantially parallel to the longitudinal axis of centerline 215 at the current location of the vehicle 100. In such case, the yaw $\psi_{rel}$ can be substantially zero.

The set of travel lane parameters determined by the travel lane parameter determination module 134 can be used for any suitable purpose. For instance, the set of travel lane parameters can be used to model the road geometry and/or the motion of the vehicle 100. Such modeling can be performed in any suitable manner, including using any suitable modeling technique, now known or later developed. FIG. 5 shows some non-limiting examples of equations for modeling the road geometry and/or the motion of the vehicle 100. The equations include the travel lane parameters described above, as well as some additional variables. For instance, in the equations shown, $r_a$ is the absolute yaw rate and $r_b$ is the yaw rate bias. The yaw rate sensor output ($r_m$) can be determined according to the following equation: $r_m = r_a + r_b$. In some arrangements, one of more of these equations can include Gaussian noise models. Other suitable models are described in, for example, "Combined road prediction and target tracking in collision avoidance" by Eidehall et al. as well as in "Lane departure detection for improved road geometry estimation" by Schön et al., both of which are incorporated herein by reference.

In one or more arrangements, the vehicle 100 can include a travel lane parameter reliability module 135. The travel lane parameter reliability module 135 can be implemented as computer readable program code that, when executed by a processor, implement one or more of the various processes described herein. The travel lane parameter reliability module 135 can be a component of the processor 110, or the travel lane parameter reliability module 135 can be executed on and/or distributed among other processing systems to which the processor 110 is operatively connected. The travel lane parameter reliability module 135 can include instructions (e.g., program logic) executable by the processor 110. Alternatively or in addition, the data store 115 may contain such instructions.

In some arrangements, the travel lane parameter reliability module 135 be configured to determine which if any of the set of travel lane parameters are reliable. "Determine which if any of the set of travel lane parameters are reliable" means determining if one, more than one, or none of set of travel lane parameters are reliable. "Reliable" means that there is sufficient information available to compute a travel lane parameter.

The determination of which if any of the set of travel lane parameters are reliable can be performed in any suitable manner. For instance, in one or more arrangements, the travel lane parameter reliability module 135 be configured to make the determination based on the determined detection range. For instance, the detection range, as determined by the detection range determination module 133, can be compared to a predetermined threshold detection range. According to arrangements described herein, the determination of which if any of the set of travel lane parameters are reliable can depend on whether the determined detection range is greater or less than the predetermined threshold detection range.

In one or more arrangements, responsive to determining that the detection range is above the predetermined threshold detection range, it can be determined that all of the set of travel lane parameters are reliable. In such case, all of the set of travel lane parameters can be used to determine a vehicle path. In one or more arrangements, responsive to determining that the detection range is below the predetermined threshold detection range, it can be determined that a subset of the set of travel lane parameters are reliable. The subset of the set of travel lane parameters can be predetermined. In one example, the set of travel lane parameters can include offset, curvature, curvature derivative, and yaw. In such case, the subset of the travel lane parameters can include offset, and yaw. The travel lane parameters that are not included in the subset (e.g. curvature, curvature derivative) can be ignored. In another example, the set of travel lane parameters can include lane width, offset, curvature, curvature derivative, and yaw. In such case, the subset of the travel lane parameters can include lane width, offset, and yaw.

In one or more arrangements, if the determined detection range is zero or substantially zero, then it can be determined that none of the set of travel lane parameters are reliable. In such case, none of the set of travel lane parameters can be used to determine the vehicle path. Thus, the set of travel lane parameters can be ignored.

In instances in which the detection range, as determined by the detection range determination module 133, is equal to the predetermined threshold detection range, then arrangements described herein can be configured to treat such a detection range in any suitable manner. For instance, in one or more arrangements, if the detection range is equal to the predetermined threshold detection range, then the set of travel lane parameters can be treated in the same way as when the detection range is above the predetermined threshold detection range, as described above. In one or more arrangements, if the detection range is equal to the predetermined threshold detection range, then the set of travel lane parameters can be treated in the same way as when the detection range is below the predetermined threshold detection range, as described above. In one or more arrangements, if the detection range is equal to the predetermined threshold detection range, then the set of travel lane parameters can be treated in a manner that is different from those described above.

The predetermined threshold detection range can be any suitable value and can be expressed in any suitable form. For instance, in one or more arrangements, the predetermined threshold detection range can be expressed as a temporal measure. As an example, the predetermined threshold detection range can be at least about 0.5 seconds, at least about one second, at least about 1.5 second, or at least about 2 seconds, just to name a few possibilities. In one or more arrangements, the predetermined threshold detection range can be expressed as a spatial measure. As an example, the predetermined threshold detection range can be at least about 50 feet, at least about 55 feet, at least about 60 feet, at least about 65 feet, at least about 70 feet, at least about 75 feet, at least about 80 feet, at least about 85 feet, or at least about 90 feet, just to name a few possibilities. In one or more arrangements, the predetermined threshold detection range can be variable based on the current speed of the vehicle 100. For instance, at higher speeds, the predetermined threshold detection range can be shorter (in terms of time and/or distance). In one or more arrangements, the predetermined threshold detection range can be set by a user or some other entity.

In one or more arrangements, the vehicle 100 can include a redundant lane parameter estimation module 136. The redundant lane parameter estimation module 136 can be implemented as computer readable program code that, when executed by a processor, implement one or more of the various processes described herein. The redundant lane parameter estimation module 136 can be a component of the processor 110, or the redundant lane parameter estimation module 136 can be executed on and/or distributed among other processing systems to which the processor 110 is operatively connected. The redundant lane parameter estimation module 136 can include instructions (e.g., program logic) executable by the processor 110. Alternatively or in addition, the data store 115 may contain such instructions.

Figure 3:
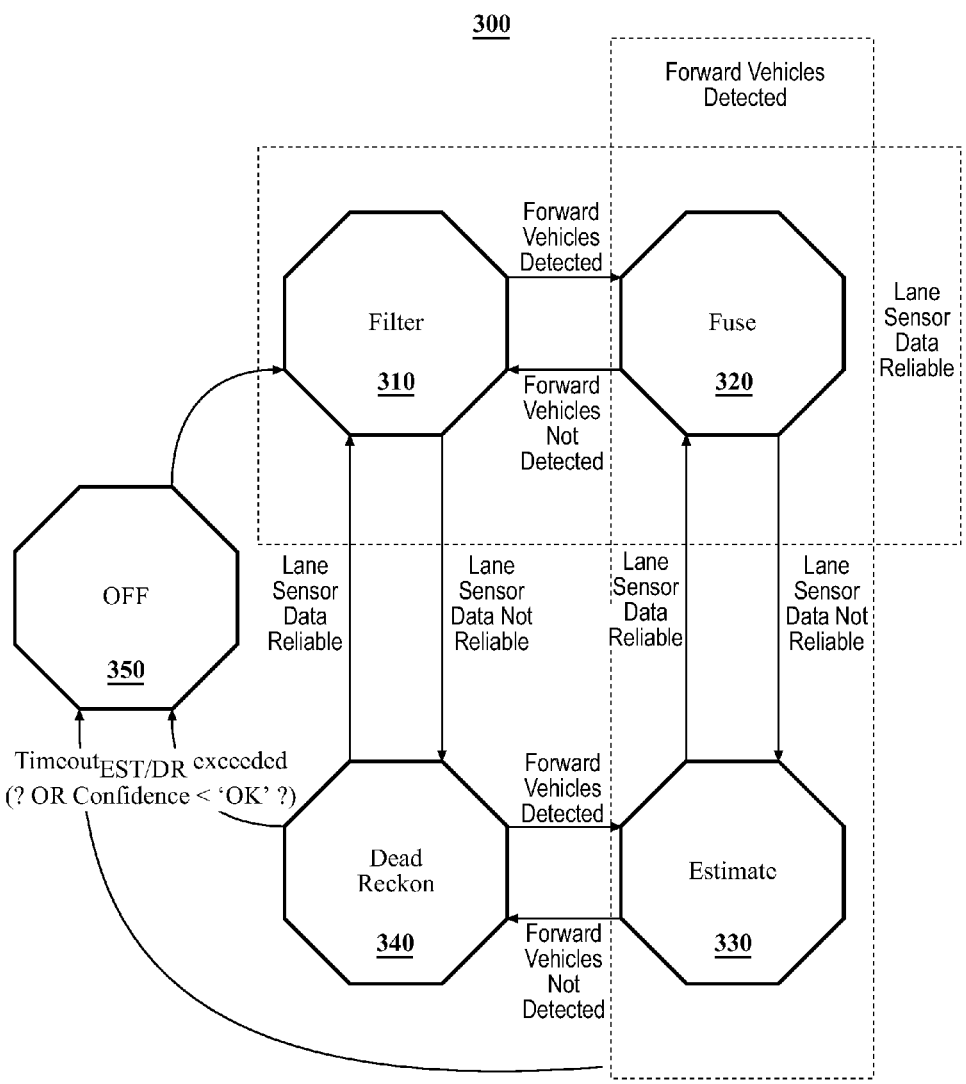
FIG. 3 is an example of a mode selection logic for a redundant lane parameter estimation module for an automated vehicle.

In some arrangements, the redundant lane parameter estimation module 136 can be configured to generate a path for the vehicle 100 according to a predefined mode of operation. Referring to FIG. 3, one example of a mode selection logic 300 for the redundant lane parameter estimation module 136 is shown. The redundant lane parameter estimation module 136 can select a different mode for determining travel lane parameters based on the information sources available at a given time (e.g., which sensors are providing measurements or which sensors are providing reliable or good measurements). The various modes can determine certain travel lane parameters in different manners.

For instance, in a first mode 310, if the sensor data acquired by the sensor system 125 and/or one or more sensors thereof (and/or the travel lane parameters based on such sensor data) is determined to be reliable and if no forward vehicles are detected in the external environment of the vehicle 100, then the travel lane parameters can be determined based on the sensor data acquired by one or more sensors of the sensor system 125 and/or the intrinsic movement of the vehicle 100 (e.g., speed and yaw rate), as described above in connection with the travel lane parameter determination module 134. It can be determined whether such travel lane parameters are reliable, as described above in connection with the travel lane parameter reliability module 135. "Forward vehicle" means a vehicle in the external environment that is located ahead of the vehicle in the travel direction of the vehicle. A forward vehicle can include one or more vehicles located in the same travel lane as the vehicle 100. In some instances, a forward vehicle can include one or more vehicles located in neighboring travel lanes to the current travel lane of the vehicle 100 and the travel direction of the other travel lanes is substantially the same as the current travel lane of the vehicle 100.

In second mode 320, if the sensor data acquired by the sensor system 125 and/or one or more sensors thereof (and/or the travel lane parameters based on such sensor data) is determined to be reliable and if one or more forward vehicles are detected in the external environment of the vehicle 100, then the travel lane parameters determined based on the sensor data acquired by one or more sensors of the sensor system 125 can be fused with travel lane parameters determined based on the motion of one or more forward vehicles in the external environment. Any suitable fusion algorithm can be used. For instance, in one or more arrangements, a Kalman Filter fusion algorithm can be used. The travel lane parameters determined based on the sensor data acquired by the sensor system 125 can be determined as described above in connection with the travel lane parameter determination module 134. Further, it can be determined whether such travel lane parameters are reliable, as described above in connection with the travel lane parameter reliability module 135.

Information about the motion of the one or more forward vehicles can be obtained from any suitable sensors of the sensors system 125 (e.g., one or more lidar sensors 128, one or more radar sensors 127, one or more cameras 129, one or more sonar sensors, etc.). In some arrangements, the redundant lane parameter estimation module 136 can make one or more assumptions about the forward vehicles. For instance, in one non-limiting example, the redundant lane parameter estimation module 136 can assume that the forward vehicle(s) follow the centerline of their respective travel lane. As another non-limiting example, the redundant lane parameter estimation module 136 can assume that the forward vehicle(s) do not change travel lanes or cut-in other travel lanes.

In a third mode 330, if the sensor data acquired by the sensor system 125 and/or one or more sensors thereof (and/or the travel lane parameters based on such sensor data) is determined to be unreliable and if one or more forward vehicles are detected in the external environment of the vehicle 100, then the travel lane parameters can be determined based on the motion of one or more forward vehicles in the external environment. The sensor data can be considered to be unreliable in one or more ways. For instance, the sensor data can be considered to be unreliable if one or more sensors are not activated, inoperative, disabled. Alternatively or in addition, the sensor data can be considered to be unreliable if one or more environmental conditions (e.g., snow, fog, sun, etc.) prevents the sensor system 125 (or one or more sensors thereof) from acquiring meaningful sensor data. Alternatively or in addition, the sensor data can be determined to be unreliable based on the determined detection range. For instance, if the determined detection range is below a predetermined threshold, then the sensor data can be determined to be unreliable.

In a fourth mode 340, if the sensor data acquired by the sensor system 125 and/or one or more sensors thereof (and/or the travel lane parameters based on such sensor data) is determined to be unreliable and if no forward vehicles are detected in the external environment of the vehicle 100, then the travel lane parameters can be determined according to a dead reckoning mode. In such a mode, the travel lane parameters can be determined using the last best estimate of the travel lane parameters and estimating travel lane parameters by forward integration of a dynamic model of the travel lane motion.

In some arrangements, the redundant lane parameter estimation module 136 can include an off mode 350. The off mode 350 can be activated in one or more ways. For instance, the off mode 350 can be activated when a timeout is exceeded. Alternatively or in addition, the off mode 350 can be activated when a confidence level of the last best estimate of the travel lane parameters is below a predetermined confidence level. In the off mode 350, the vehicle 100 can switch to a manual operational mode or a mode in which a greater amount of driver input is required.

In one or more arrangements, the redundant lane parameter estimation module 136 can be configured to assume that the vehicle 100 does not change travel lanes. In one or more arrangements, the redundant lane parameter estimation module 136 can also be configured to assume that the road geometry is a Clothoid. However, it will be understood that arrangements described herein are not limited to such assumptions. Indeed, the redundant lane parameter estimation module 136 can include additional, fewer, and/or alternative assumptions.

In one or more arrangements, one or more of the modules 120, 132, 133, 134, 135, 136 described herein can include artificial or computational intelligence elements, e.g., neural network, fuzzy logic or other machine learning algorithms. Further, in one or more arrangements, one or more of the modules 120, 132, 133, 134, 135, 136 can be distributed among a plurality of the modules described herein. In one or more arrangements, two or more of the modules 120, 132, 133, 134, 135, 136 described herein can be combined into a single module.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100. The vehicle 100 can include a propulsion system 150, a braking system 155, a steering system 160, throttle system 165, a transmission system 170, a signaling system 175, and/or a navigation system 180. Each of these systems can include one or more mechanisms, devices, elements, components, systems, and/or combination thereof, now known or later developed The processor 110 and/or the automated driving module 120 can be operatively connected to communicate with the various vehicle systems 145 and/or individual components thereof. For example, returning to FIG. 1, the processor 110 and/or the automated driving module 120 can be in communication to send and/or receive information from the various vehicle systems 145 to control the movement, speed, maneuvering, heading, direction, etc. of vehicle 100. The processor 110 and/or the automated driving module 120 may control some or all of these vehicle systems 145

The processor 110 and/or the automated driving module 120 may be operable to control the navigation and/or maneuvering of the vehicle 100 by controlling one or more of the vehicle systems 145 and/or components thereof. For instance, when operating in an automated mode, the processor 110 and/or the automated driving module 120 can control the direction and/or speed of the vehicle 100. The processor 110 and/or the automated driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110 and/or the automated driving module 120. Any suitable actuator can be used. For instance, the one or more actuators 140 can include motors, pneumatic actuators, hydraulic pistons, relays, solenoids, and/or piezoelectric actuators, just to name a few possibilities.

According to arrangements described herein, the vehicle 100 can be configured to generate a path for the automated vehicle 100. In one or more arrangements, the path can be defined by one or more driving maneuvers. However, alternatively or in addition, the path can be defined in any other suitable manner. The generation of the path can be based at least partially on the travel lane parameters that are determined to be reliable. The automated vehicle 100 can be caused to implement the path.

Figure 4:
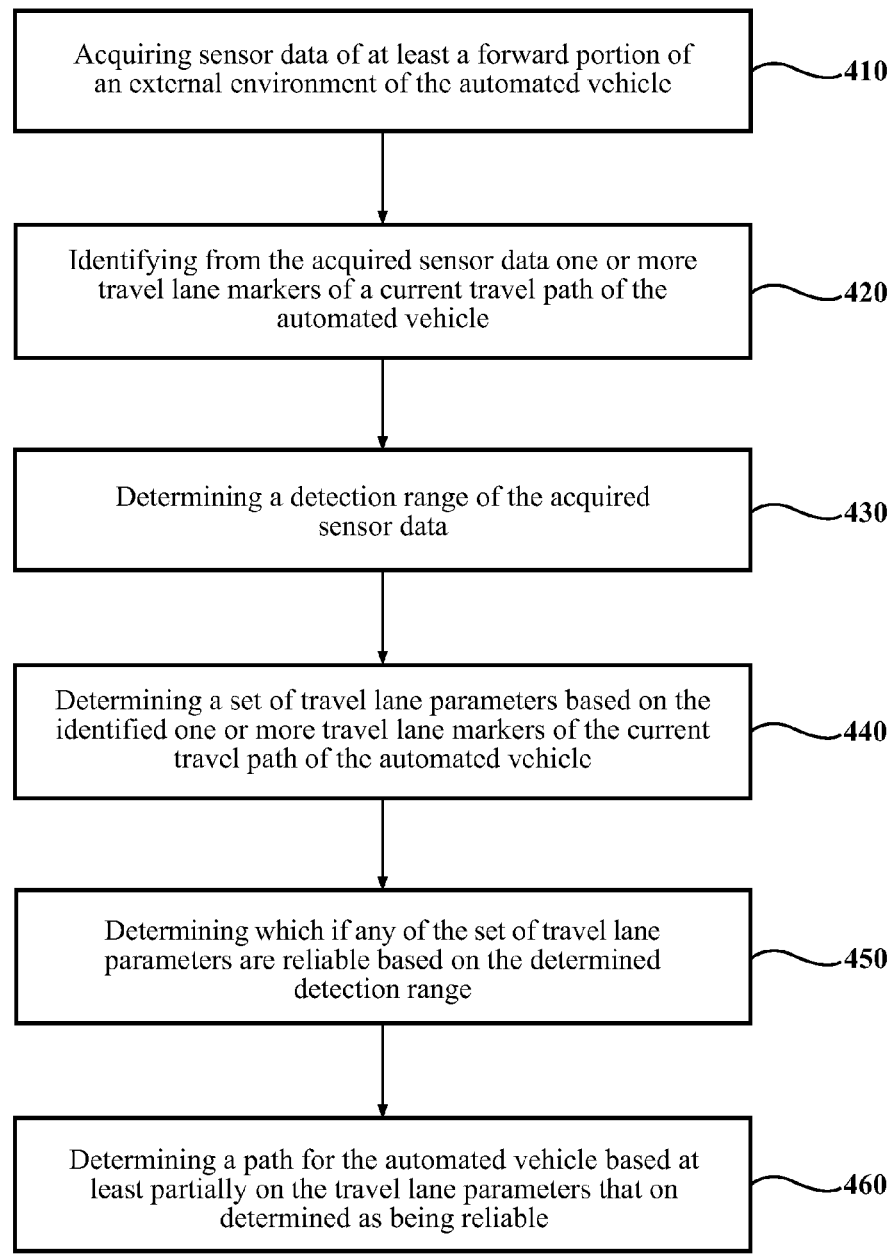
FIG. 4 is an example of a method for generating a path for an automated vehicle.

Now that the various potential systems, devices, elements and/or components of the vehicle 100 have been described, various methods will now be described. Referring now to FIG. 4, an example of generating a path for an automated vehicle is shown. Various possible steps of method 400 will now be described. The method 400 illustrated in FIG. 4 may be applicable to the embodiments described above in relation to FIGS. 1-3, but it is understood that the method 400 can be carried out with other suitable systems and arrangements. Moreover, the method 400 may include other steps that are not shown here, and in fact, the method 400 is not limited to including every step shown in FIG. 4. The steps that are illustrated here as part of the method 400 are not limited to this particular chronological order. Indeed, some of the steps may be performed in a different order than what is shown and/or at least some of the steps shown can occur simultaneously.

At block 410, sensor data of a forward portion of an external environment of the automated vehicle can be acquired. The sensor data can be acquired continuously, periodically at any suitable interval, irregularly, or even randomly. The acquiring of sensor data can be performed by any suitable element or combination of elements of the vehicle 100. In one or more arrangements, the sensor data can be acquired by one or more sensors of the sensor system 125. For instance, in one or more arrangements, visual data can be acquired of a forward portion of an external environment of the automated vehicle using one or more cameras 129. Alternatively or in addition, lidar data can be acquired of a forward portion of an external environment of the automated vehicle using one or more lidar sensors 128. The method 400 can continue to block 420.

At block 420, one or more travel lane markers for a current travel path of the automated vehicle can be identified within the acquired sensor data. In one or more arrangements, a pair of travel lane markers for the current travel path of the automated vehicle can be identified. Such identifying can be performed by any suitable element or combination of elements of the vehicle 100. In one or more arrangements, the identifying of one or more travel lane markers can be performed, at least in part, by the sensor system 125 (or component thereof), the travel lane marker identification module 132 and/or the processor 110. The method 400 can continue to block 430.

At block 430, a detection range of the acquired sensor data can be determined. The detection range can be a spatial characteristic and/or a temporal characteristic. The detection range can be determined in any suitable manner. For instance, the detection range of the acquired sensor data can be determined relative to the identified one or more lane markers. The detection range can be determined continuously, periodically at any suitable interval, irregularly, or even randomly. The determining can be performed by any suitable element or combination of elements of the vehicle 100. In one or more arrangements, the determining of the detection range can be performed, at least in part, by the sensor system 125 (or component thereof), the detection range determination module 133 and/or the processor 110. The method 400 can continue to block 440.

At block 440, a set of travel lane parameters based on the identified one or more travel lane markers can be determined. The set of travel lane parameters can be a predetermined set of one or more travel lane parameters. In one or more arrangements, the set of travel lane parameters can include offset, curvature, curvature derivative, and/or yaw. The determining can be performed by any suitable element or combination of elements of the vehicle 100. In one or more arrangements, the determining of a set of travel lane parameters based on the identified one or more travel lane markers can be performed, at least in part, by the travel lane parameter determination module 134 and/or the processor 110. The method 400 can continue to block 450.

At block 450, it can be determined which if any of the determined travel lane parameters are reliable based on the determined detection range. In some arrangements, such a determination can be made after the determination in block 440. In other arrangements, such a determination can be made before the determination in block 440. The determining can be performed by any suitable element or combination of elements of the vehicle 100. In one or more arrangements, the determining which if any of the determined travel lane parameters are reliable based on the determined detection range can be performed, at least in part, by the travel lane parameter reliability module 135 and/or the processor 110.

Determining which if any of the determined travel lane parameters are reliable based on the determined detection range can be performed in any suitable manner. In one or more arrangements, the determined detection range can be compared to a predetermined threshold detection range. The predetermined threshold detection range can have any suitable value. As an example, the predetermined threshold detection range can be about 1 second. If the detection range is determined to be above the predetermined threshold detection range, all of the set of travel lane parameters can be determined to be reliable. However, if the detection range is determined to be below the predetermined threshold detection range, a subset of the set of travel lane parameters can be determined to be reliable. In one or more arrangements, the set of travel lane parameters can include offset, curvature, curvature derivative, and yaw, and the subset of the set of travel lane parameters can include offset, and yaw. In such case, the other travel lane parameters that are not included in the subset (e.g., curvature and curvature derivative) can be ignored. If the determined detection range is substantially zero, it can be determined that none of the lane parameters are reliable. In such case, the set of travel lane parameters can be ignored.

When it is determined which if any of the determined travel lane parameters are reliable based on the determined detection range, the method 400 can end. Alternatively, the method 400 can return to block 410. As a further alternative, the method 400 can include additional blocks (not shown). For instance, the method 400 can include determining a path for the vehicle based at least partially on any determined travel lane parameters that are identified as being reliable. In one or more arrangements, the vehicle path can be defined at least partially by one or more driving maneuvers. Such driving maneuvers can include a movement in the lateral direction 106 and/or the longitudinal direction 104 of the vehicle 100. In one or more arrangements, the method 400 can include causing the automated vehicle 100 to implement the determined path.

Still further, the method 400 can include sensing the forward portion of the external environment of the automated vehicle using a ranging sensor (e.g., the radar sensor 127) to obtain ranging data of the external environment. In one or more arrangements, based on the ranging data, it can be detected whether one or more forward vehicles are located in the external environment of the vehicle. In response to detecting one or more forward vehicles in the external environment based on the ranging data, visual data acquired using one or more cameras 129 can be fused with the ranging data. In one or more arrangements, the determining of which if any of the determined travel lane parameters are reliable can be performed in instances in which a forward vehicle is not detected in the external environment based on the ranging data.

It will be appreciated that arrangements described herein can provide numerous benefits, including one or more of the benefits mentioned herein. For example, arrangements described herein can improve the performance of an automated vehicle. Arrangements described herein can facilitate the safe operation of an automated vehicle. Arrangements described herein can improve path generation for automated vehicle. Arrangements described herein can support smoother transitions to manual operation of an automated vehicle or to an operational mode in which a greater degree of manual input is involved. Arrangements described herein can minimize the need to switch to manual operational modes in certain situations (e.g., on bridges, overpasses, and/or areas with faded lane markers).

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing.

Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of generating a path for an automated vehicle, comprising:
    acquiring sensor data of at least a forward portion of an external environment of the automated vehicle;
    identifying from the acquired sensor data one or more travel lane markers of a current travel path of the automated vehicle;
    determining a detection range of the acquired sensor data;
    determining a set of travel lane parameters based on the identified one or more travel lane markers of the current travel path of the automated vehicle;
    determining which if any of the set of travel lane parameters are reliable based on the determined detection range; and
    determining a path for the automated vehicle based at least partially on the travel lane parameters that are determined as being reliable.

2. The method of claim 1, further including:
    causing the automated vehicle to implement the determined path.

3. The method of claim 1, wherein determining which if any of the set of travel lane parameters are reliable based on the determined detection range includes:
    comparing the detection range to a predetermined threshold detection range; and
    responsive to determining that the detection range is above the predetermined threshold detection range, determining that all of the set of travel lane parameters are reliable.

4. The method of claim 1, wherein determining which if any of the set of travel lane parameters are reliable based on the determined detection range includes:

comparing the detection range to a predetermined threshold detection range; and responsive to determining that the detection range is below the predetermined threshold detection range, determining that a subset of the set of travel lane parameters are reliable.

5. The method of claim 4, wherein the set of travel lane parameters includes:
offset, curvature, curvature derivative, and yaw, and wherein the subset of the set of travel lane parameters includes offset, and yaw.

6. The method of claim 1, wherein the set of travel lane parameters includes at least: offset, curvature, curvature derivative, and yaw.

7. The method of claim 1, wherein, if the determined detection range is substantially zero, determining that none of the set of travel lane parameters are reliable, and ignoring the set of travel lane parameters.

8. The method of claim 1, wherein the sensor data is visual data, and wherein the method further includes:
sensing the forward portion of the external environment of the automated vehicle using a ranging sensor to obtain ranging data;
analyzing the ranging data to detect whether one or more forward vehicles are located in the external environment; and
responsive to detecting that one or more forward vehicles are located in the external environment, fusing the visual data and the ranging data.

9. The method of claim 1, wherein determining the detection range of the acquired sensor data is made relative to the identified one or more travel lane markers of a current travel path of the automated vehicle.

10. A system for generating a path for an automated vehicle, comprising:
a sensor system including one or more sensors configured to:
acquire sensor data of at least a forward portion of an external environment of the automated vehicle; and
a processor operatively connected to the sensor system, the processor being programmed to initiate executable operations comprising:
identifying from the acquired sensor data one or more travel lane markers of a current travel path of the automated vehicle;
determining a detection range of the acquired sensor data;
determining a set of travel lane parameters based on the identified one or more travel lane markers of the current travel path of the automated vehicle;
determining which if any of the set of travel lane parameters are reliable based on the determined detection range; and
determining a path for the automated vehicle based at least partially on the travel lane parameters that are determined as being reliable.

11. The system of claim 10, wherein the executable operations further include:
causing the automated vehicle to implement the determined path.

12. The system of claim 10, wherein determining which if any of the set of travel lane parameters are reliable based on the determined detection range includes:
comparing the detection range to a predetermined threshold detection range; and responsive to determining that the detection range is above the predetermined threshold detection range, determining that all of the set of travel lane parameters are reliable.

13. The system of claim 10, wherein determining which if any of the set of travel lane parameters are reliable based on the determined detection range includes:
comparing the detection range to a predetermined threshold detection range; and
responsive to determining that the detection range is below the predetermined threshold detection range, determining that a subset of the set of travel lane parameters are reliable.

14. The system of claim 13, wherein the set of travel lane parameters includes: offset, curvature, curvature derivative, and yaw, and wherein the subset of the set of travel lane parameters includes offset, and yaw.

15. The system of claim 10, wherein, if the determined detection range is substantially zero, determining that none of the set of travel lane parameters are reliable, and ignoring the set of travel lane parameters.

16. The system of claim 10, wherein the one or more sensors are one or more cameras, wherein the one or more cameras are configured to acquire visual data of at least a forward portion of an external environment of the automated vehicle, and
wherein the sensor system further includes one or more ranging sensors, the one or more ranging sensors being configured to sense the forward portion of the external environment of the automated vehicle to obtain ranging data, and
wherein the executable operations further include:
analyzing the ranging data to detect whether one or more forward vehicles are located in the external environment; and
responsive to detecting that one or more forward vehicles are located in the external environment, fusing the visual data and the ranging data.

17. A computer program product for generating a path for an automated vehicle, the computer program product comprising a non-transitory computer readable storage medium having program code embodied therein, the program code executable by a processor to perform a method comprising:
acquiring sensor data of at least a forward portion of an external environment of the automated vehicle;
identifying from the acquired sensor data one or more travel lane markers of a current travel path of the automated vehicle;
determining a detection range of the acquired sensor data;
determining a set of travel lane parameters based on the identified one or more travel lane markers of the current travel path of the automated vehicle;
determining which if any of the set of travel lane parameters are reliable based on the determined detection range; and
determining a path for the automated vehicle based at least partially on the travel lane parameters that are determined as being reliable.

18. The computer program product of claim 17, wherein determining which if any of the set of travel lane parameters are reliable based on the determined detection range includes:
comparing the detection range to a predetermined threshold detection range; and responsive to determining that the detection range is above the predetermined threshold detection range, determining that all of the set of travel lane parameters are reliable.

19. The computer program product of claim 17, wherein determining which if any of the set of travel lane parameters are reliable based on the determined detection range includes:
comparing the detection range to a predetermined threshold detection range; and
responsive to determining that the detection range is below the predetermined threshold detection range, determining that a subset of the set of travel lane parameters are reliable.

20. The computer program product of claim 17, wherein, if the determined detection range is substantially zero, determining that none of the set of travel lane parameters are reliable, and ignoring the set of travel lane parameters.

* * * * *